March 17, 1964
F. A. KAMAN
3,125,200
PNEUMATIC HOIST
Filed March 2, 1959
9 Sheets-Sheet 1
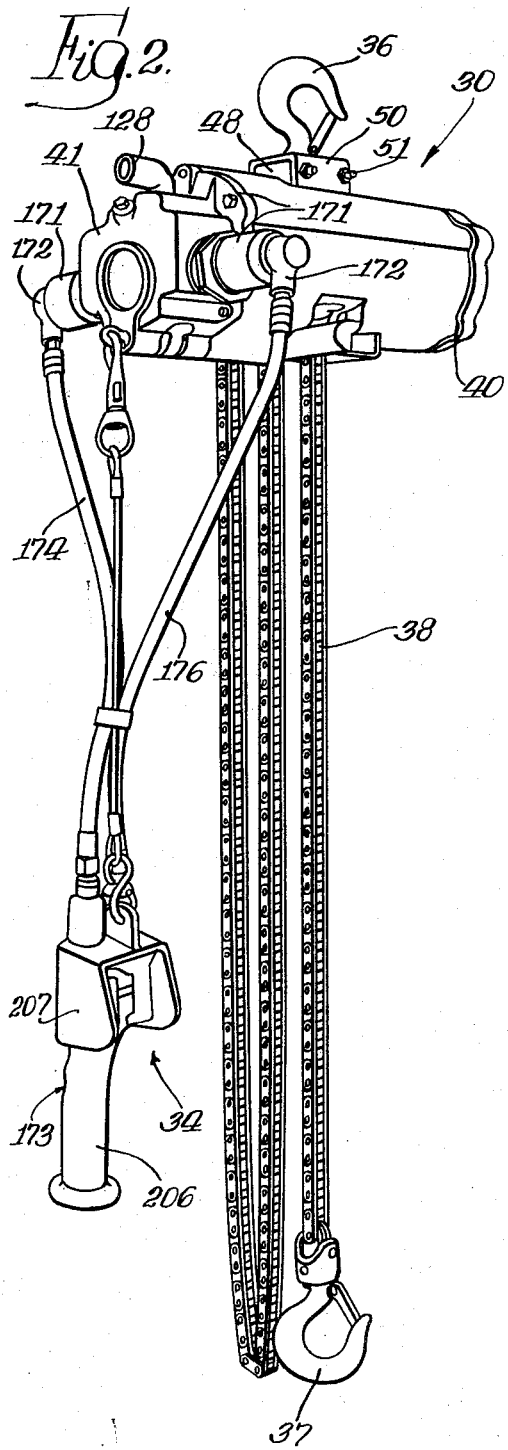
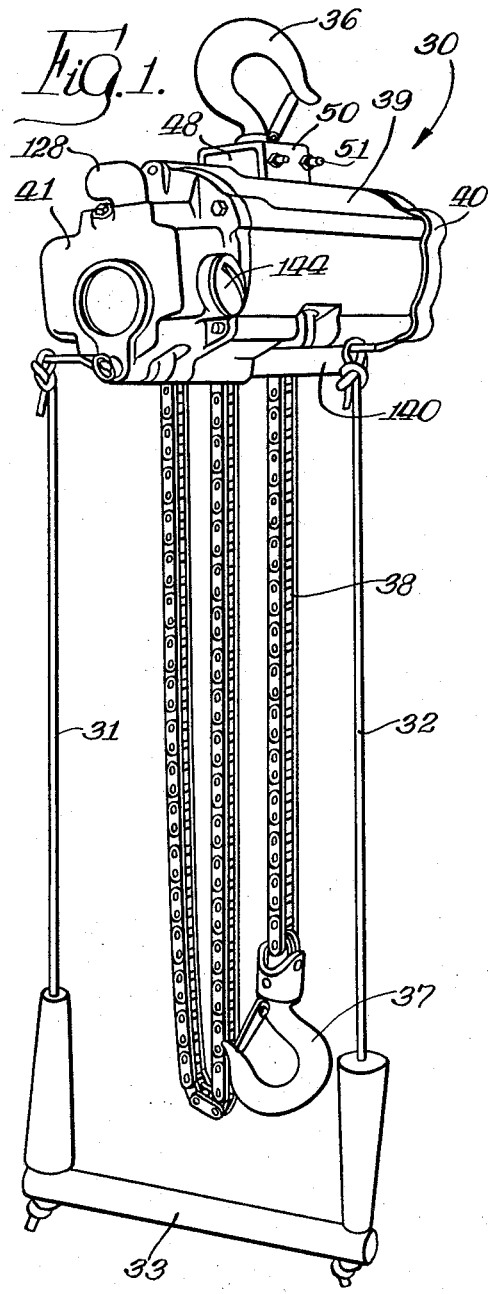
INVENTOR.
Frank A. Kaman,
BY
Davis, Lindsey, Hibben & Noyes
Atty's.

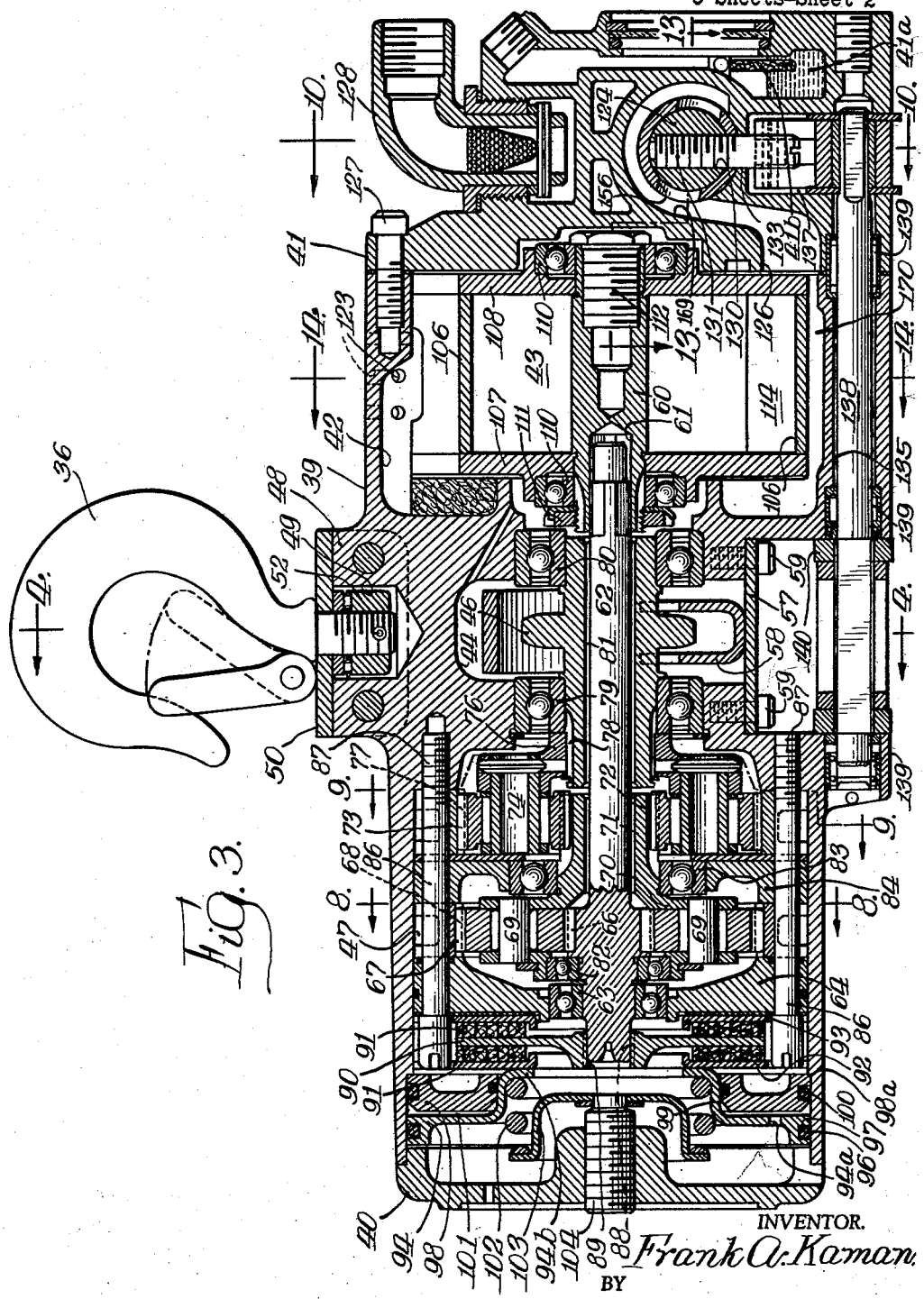

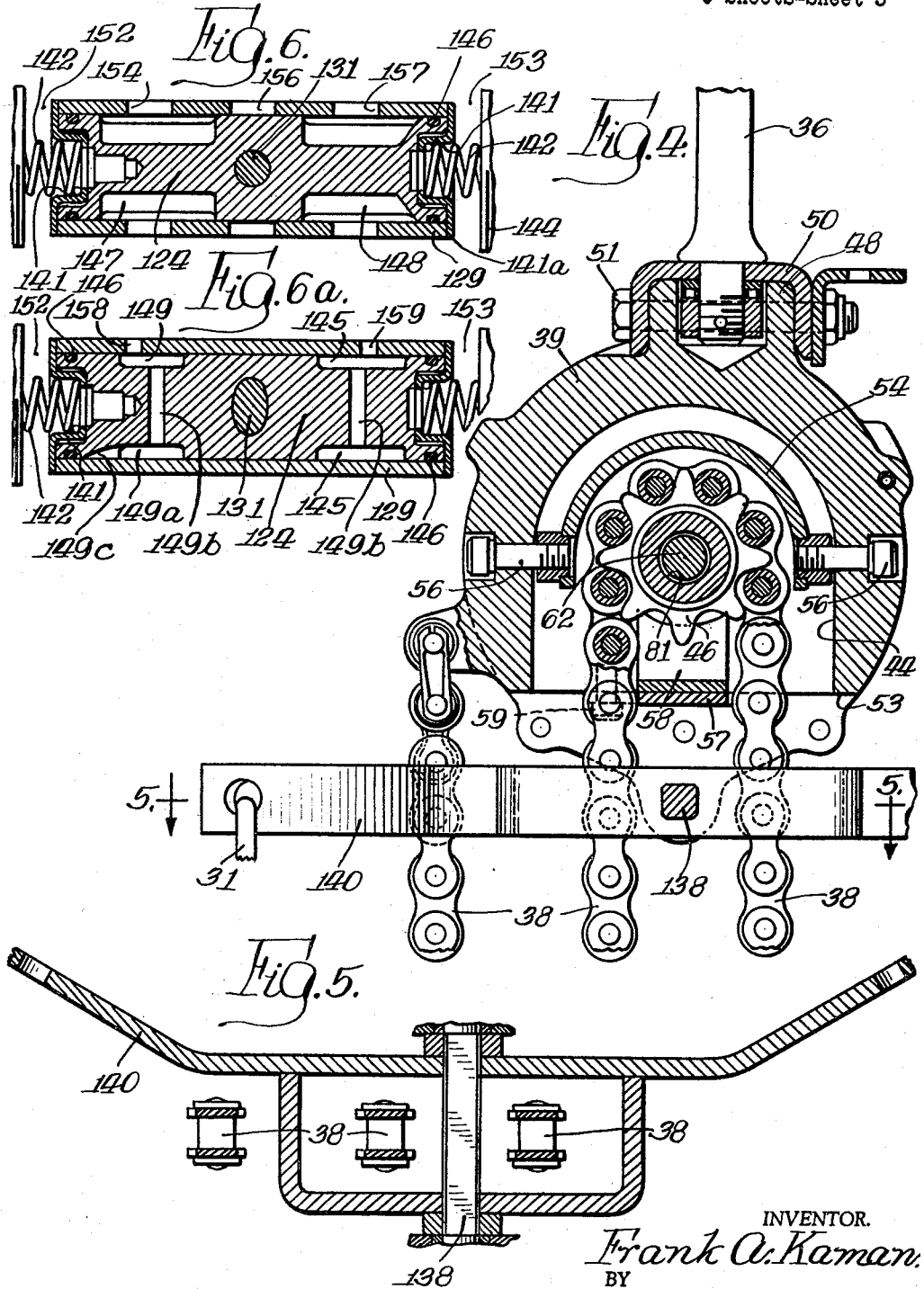

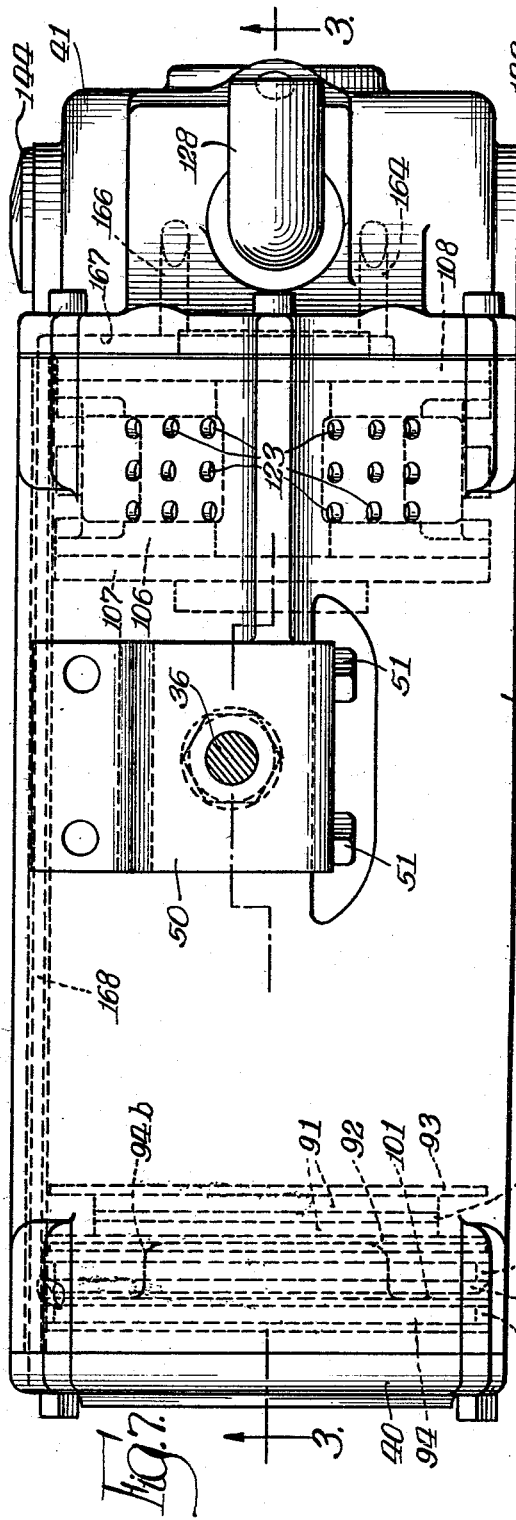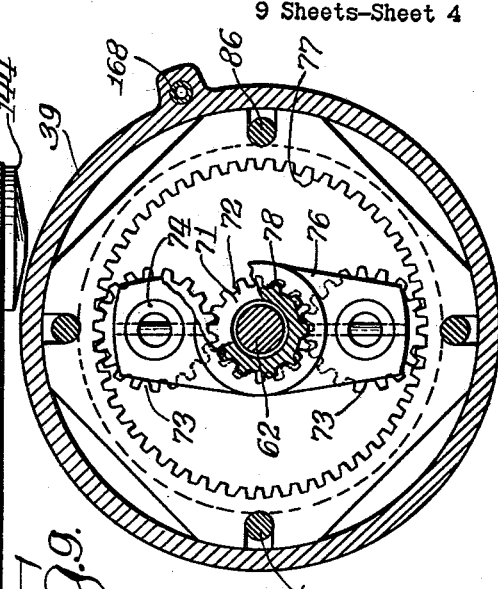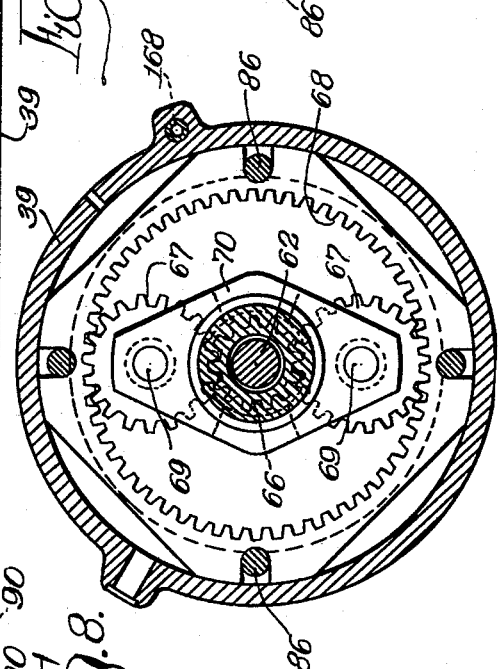

March 17, 1964  F. A. KAMAN  3,125,200
PNEUMATIC HOIST

Filed March 2, 1959  9 Sheets-Sheet 5

INVENTOR.
Frank A. Kaman.
BY
Davis, Lindsey, Hibben & Noyes
Atty's

March 17, 1964  F. A. KAMAN  3,125,200
PNEUMATIC HOIST
Filed March 2, 1959  9 Sheets-Sheet 6
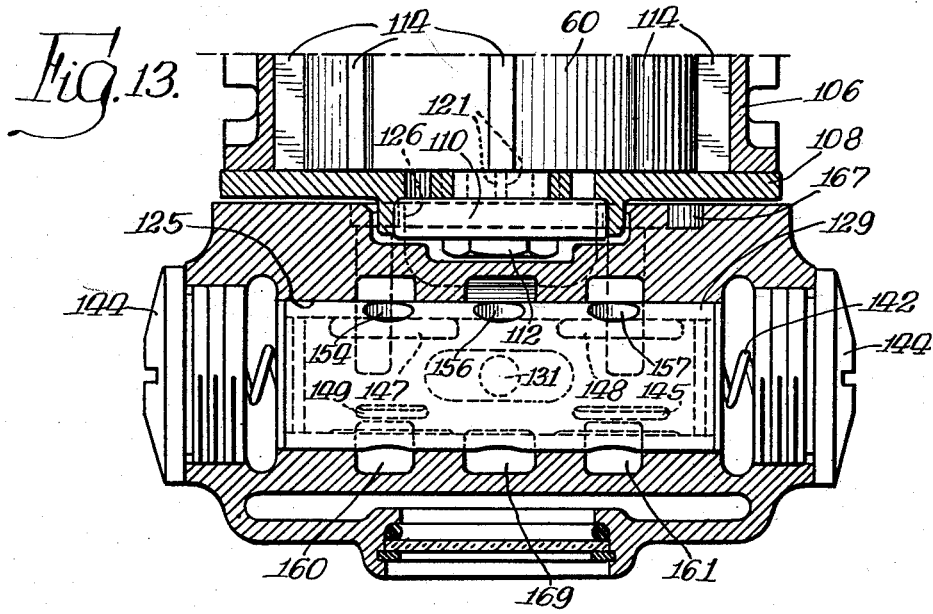
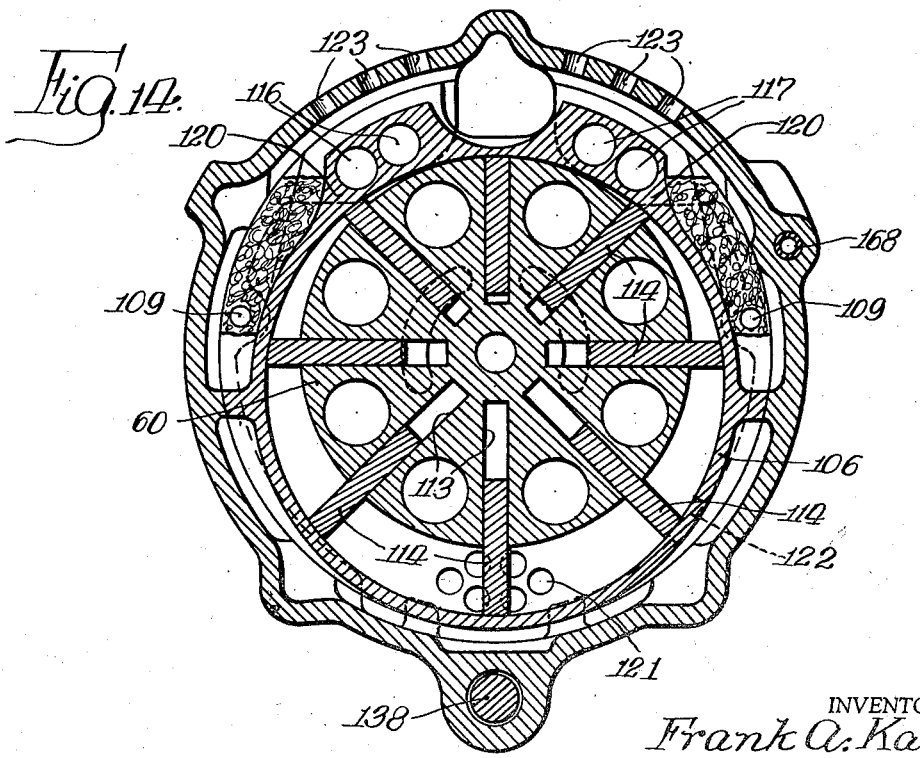
INVENTOR.
Frank A. Kaman
BY
Davis, Lindsey, Shibben & Noyes
Attys.

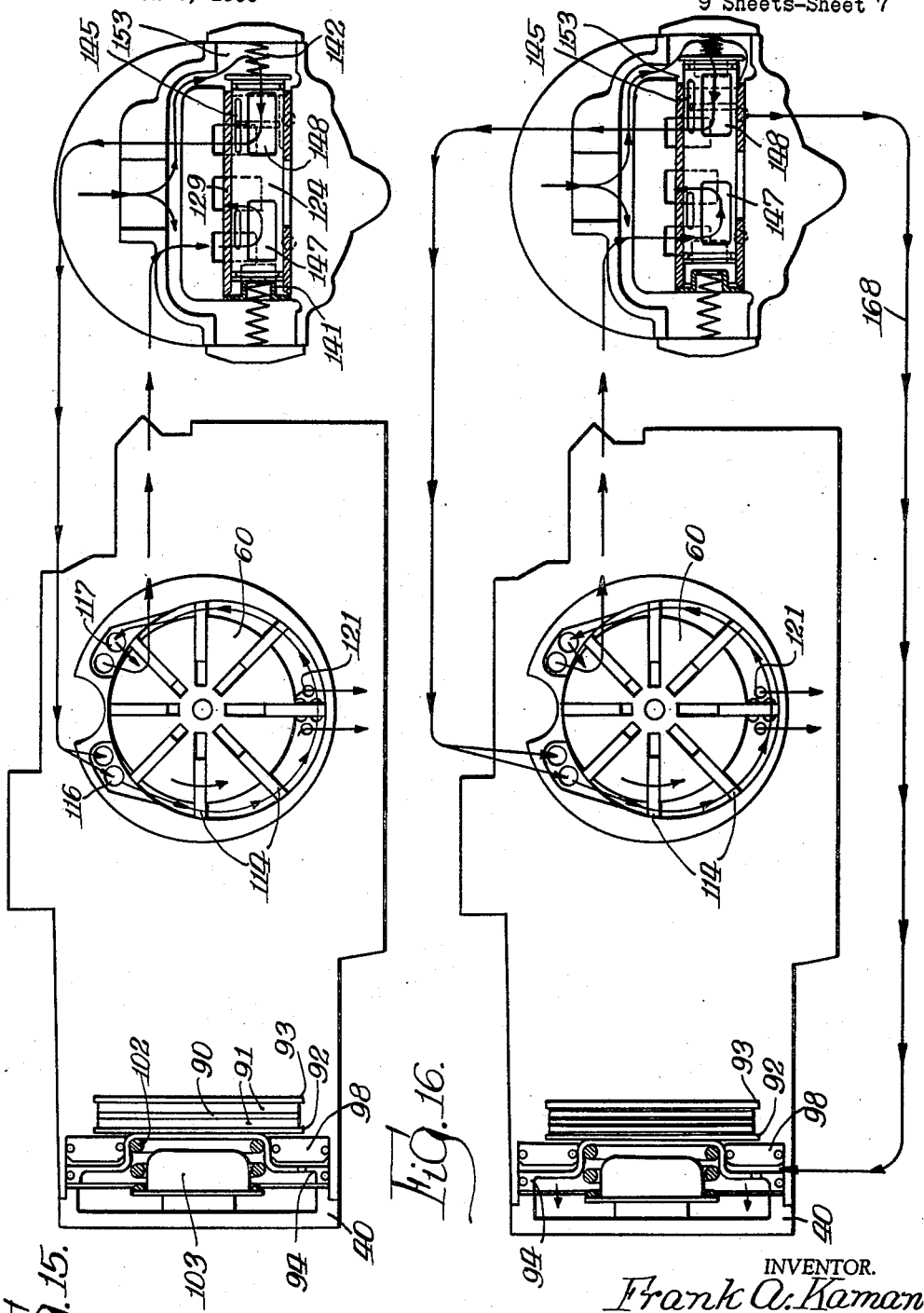

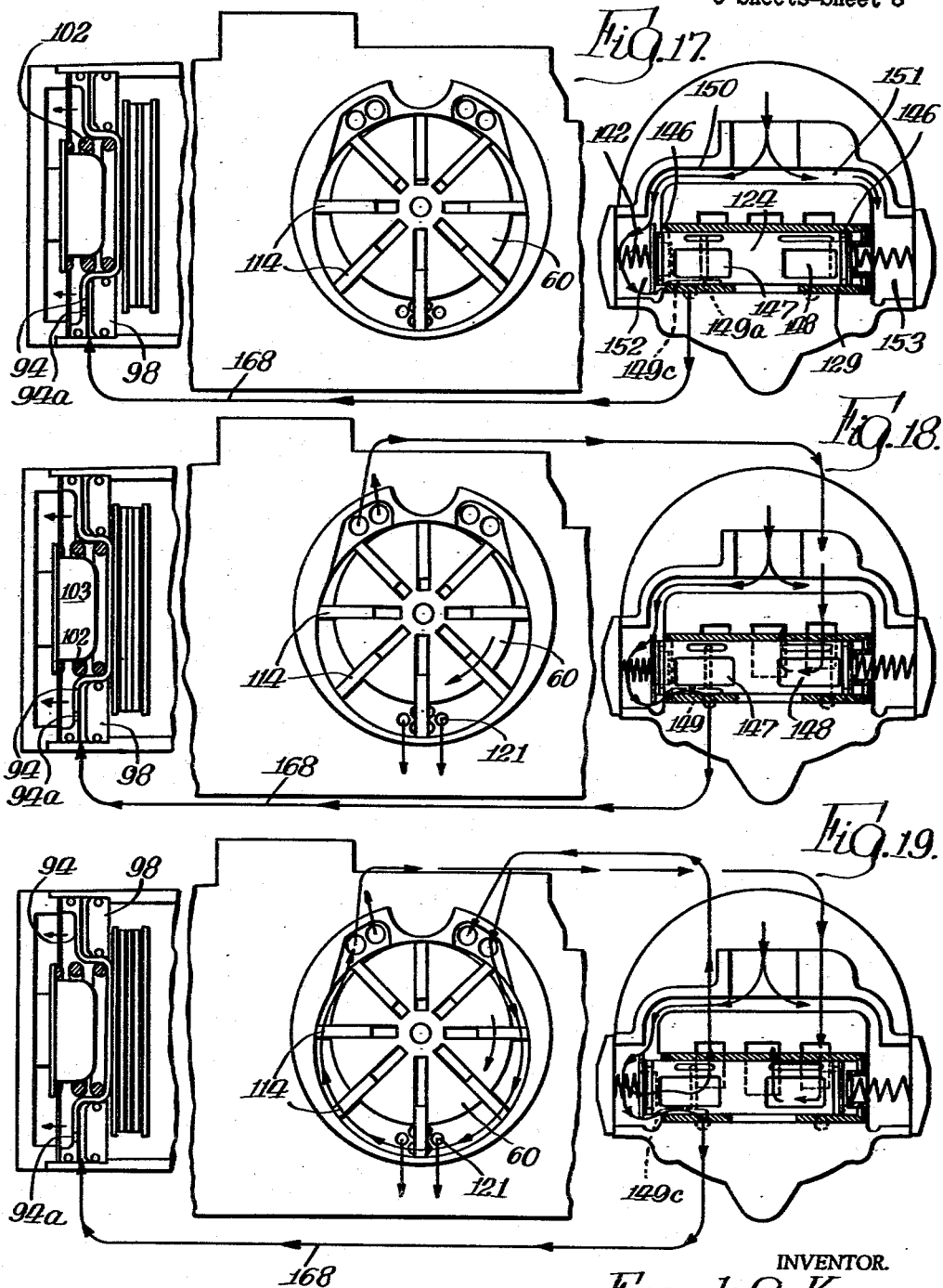

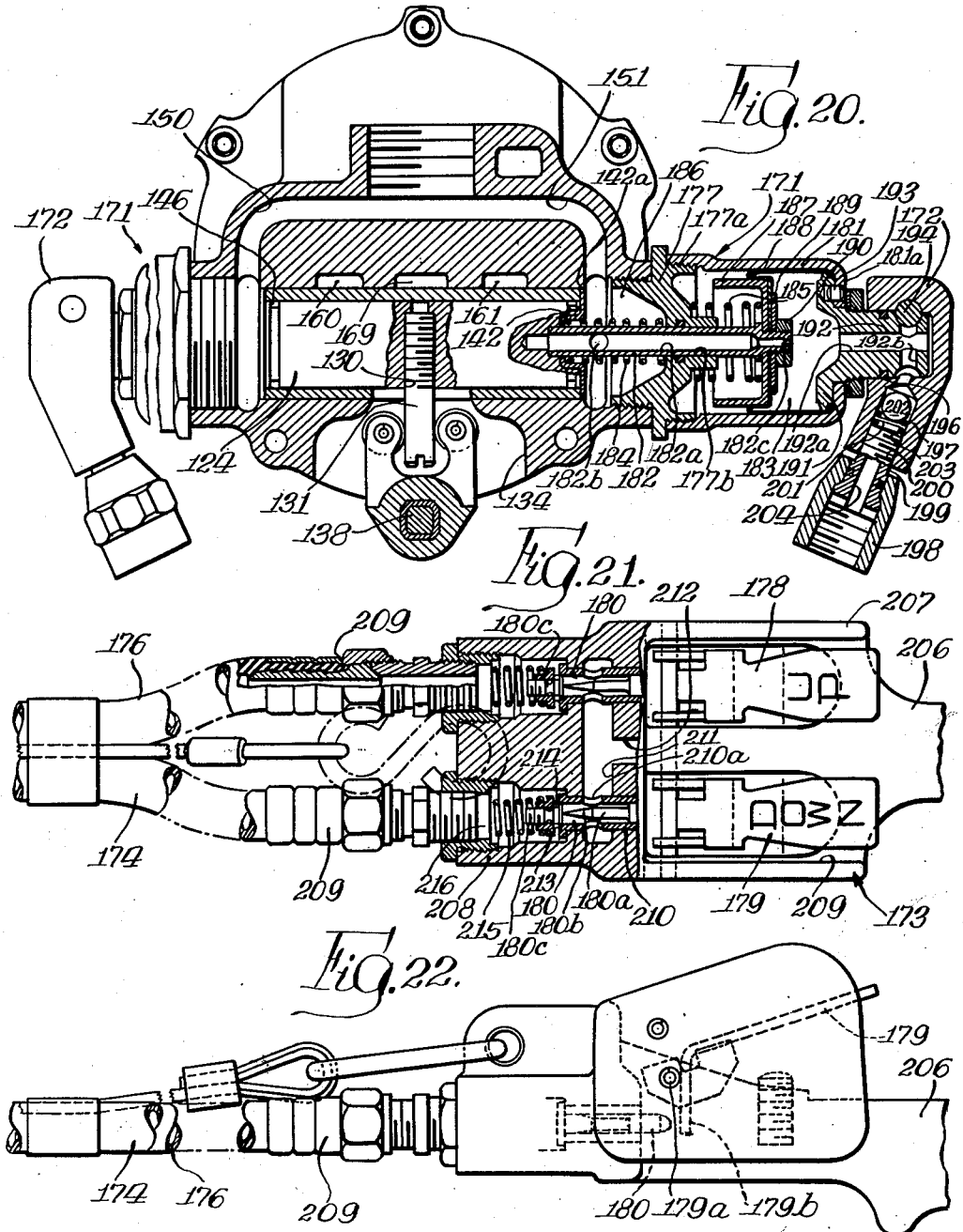

United States Patent Office 3,125,200
Patented Mar. 17, 1964

3,125,200
PNEUMATIC HOIST
Frank A. Kaman, Aurora, Ill., assignor to Thor Power
Tool Company, Aurora, Ill., a corporation of Delaware
Filed Mar. 2, 1959, Ser. No. 796,574
7 Claims. (Cl. 192—3)

This invention relates to hoists and more particularly to hoists of the pneumatically operated type adapted to be suspended by a hook or other suitable support means and to raise or lower loads to which they may be applied.

One of the principal objects of the present invention is the provision of a pneumatic power hoist comprising improved features and sensitive controls whereby a load may be raised or lowered to a desired position or elevation with precision and at varying speeds.

Another object of the invention is the provision of a pneumatic power hoist having variable speeds of descent under load under the direct and selective control of an operator, a slow speed being adapted for use in precision positioning of the load, an intermediate speed being adapted for use in approaching a desired position for the load, and a higher rate of speed being adapted for fast run down to a point approaching the desired load position.

Still another object of the invention is the provision of structures and controls for a pneumatic hoist whereby the normally spring-applied brake may be partially released by pneumatic pressure under the control of the operator to permit a load to descend at a slow rate by force of gravity to facilitate precise positioning of the load, or the brake may be fully released by operator control to permit descent of the load at an intermediate rate of speed, the air motor at such intermediate and slow rates serving as a compressor or dynamic brake to retard descent of the load and being out of communication with a source of air under pressure at said slow and intermediate rates of descent, or whereby the brake may be fully released and the air motor driven by air under pressure to lower the load at higher rates of speed.

A further object of the invention is the provision of a novel form of valve and valve control mechanism whereby the preceding objects may be accomplished, said valve serving as a throttle valve and a reversing valve.

Another further object of the invention is the provision of a pneumatically operated brake and air motor control mechanism whereby said air motor is energized on the lifting operation prior to release of said brake so that upon consequent release of said brake the motor is in driving relation to and exerts a lifting force on the load and the initial drop of the load on the lifting operation is eliminated.

A still further object of the invention is the provision of a novel form of air motor and motor mounting relative to the hoist support means whereby the vanes of said air motor are caused to be in air sealing relation against the cylinder walls even when the motor rotor is stationary, thus insuring immediate driving of the raising and lowering means under power by the motor and at any desired rate of variable speed achieved instantaneously upon the introduction of air into the motor at a rate selected by the operator and thus eliminating any delay in achieving a power drive by the motor prior to full sealing engagement by the motor vanes and assisting in the elimination of the initial drop of the load on the lifting operation.

Another object is the provision of a novel pendant control system which affords sensitive control of the hoist functions by the operator and through which the load may be precisely and rapidly positioned.

Still another object is the provision of a pendant control system of the preceding object embodying novel safety features whereby upon breakage of an air hose in the control system the control mechanisms of the system and the hoist are automatically restored to inactive position, the air motor is disconnected from the power source and the brake is automatically applied, thus holding the load in its position at the time of hose breakage.

Another further object is the provision of pneumatically operable throttle valve control cylinder and pistons in which the piston is sealed relative to the cylinder wall by a flexible sealing means so as to be relatively free-floating with low friction whereby the operator is provided with sensitive control means for precise valve control and consequent precise positioning of the load.

Other and further objects of the invention will become apparent as this description progresses, reference being had to the accompanying drawings, in which:

FIG. 1 is a perspective view of a pneumatic hoist comprising one embodiment of the present invention and embodying a manual pull chain control for operating the throttle-reversing valve;

FIG. 2 is a perspective view of a pneumatic hoist shown in FIG. 1 but with a novel form of pendant control system comprising a feature of the present invention substituted in place of the pull chain control of FIG. 1;

FIG. 3 is a vertical sectional view of the hoist shown in FIG. 1 taken along the longitudinal axis of the hoist on the line 3—3 in FIG. 7;

FIG. 4 is a transverse, vertical sectional view taken on the line 4—4 in FIG. 3 and looking in the direction of the arrows and showing a roller chain engaged with the driving sprocket;

FIG. 5 is a horizontal, sectional view taken on the line 5—5 in FIG. 4 and looking in the direction of the arrows;

FIG. 6 is a longitudinal sectional view of the throttle-reversing valve, showing the grooves for controlling air under pressure for brake operation;

FIG. 6a is a longitudinal sectional view of the throttle-reversing valve taken through the valve at right angles to the sectional view of FIG. 6.

FIG. 7 is a top plan view of the hoist shown in FIG. 3 with the supporting hook removed therefrom;

FIG. 8 is a transverse, vertical sectional view taken on the line 8—8 in FIG. 3, looking in the direction of the arrows and showing the first reduction gearing of the double planetary gear drive;

FIG. 9 is a transverse vertical sectional view taken on the line 9—9 in FIG. 3, looking in the direction of the arrows and showing the second reduction gearing of the double planetary gear drive;

FIG. 13 is an irregular, horizontal sectional view taken on the line 13—13 in FIG. 3, looking in the direction of the arrows;

FIG. 14 is a transverse vertical sectional view of the air motor and supporting means in the casing taken on the line 14—14 in FIG. 3, looking in the direction of the arrows;

FIG. 15 is a diagrammatic view showing the relative positions and conditions of the brake mechanisms, the air motor, and throttle valve and a diagram of the air flow when the throttle-reversing valve is initially moved to and is passing through its first position for the load lifting operation;

FIG. 16 is a view similar to that of FIG. 15 but with the throttle-reversing valve fully moved to its second or brake releasing position for motor operation.

FIG. 17 is a diagrammatic view similar to that of FIGS. 15 and 16 but showing the throttle-reversing valve initially moved to its first position for partial brake release in the load lowering position;

FIG. 18 is a view similar to that of FIG. 17 but showing the throttle-reversing valve moved further to its full brake release or second position and with air under pressure being admitted to the air motor;

FIG. 19 is a view similar to that of FIGS. 17 and 18 but showing the throttle valve fully moved to its third position whereby the brake is maintained in full release position and air under pressure is admitted to the air motor to positively drive the same for driving the load downwardly at a higher rate of speed;

FIG. 20 is a partial sectional view through the valve head and throttle-reversing valve showing the manner and mechanism by which the pendant control system shown in FIG. 2 is applied thereto for control of the throttle-reversing valve;

FIG. 21 is a partial sectional view of the pendant control handle and valves; and FIG. 22 is an elevational view of the pendant control shown in FIG. 21.

Figure 10:
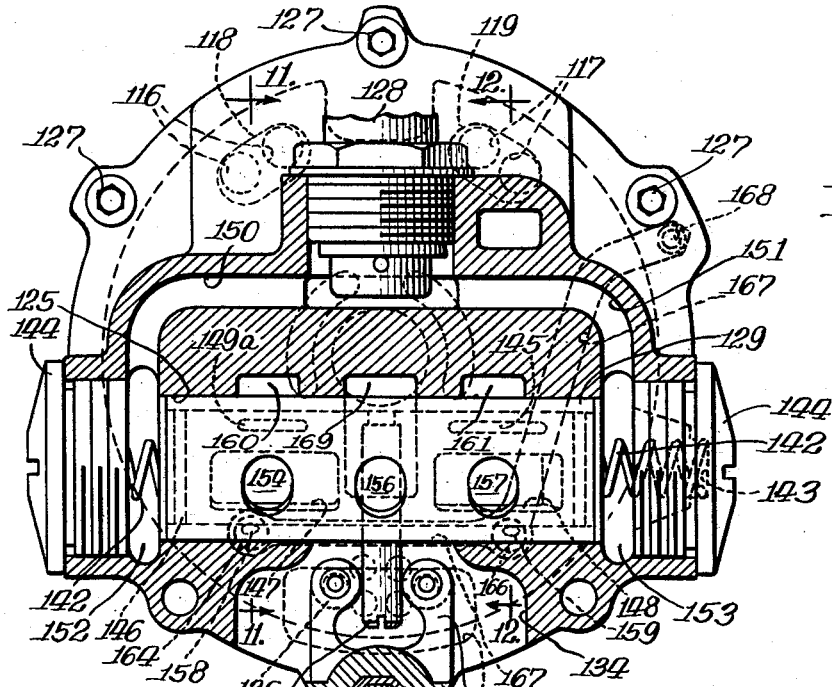
FIG. 10 is a transverse vertical sectional view of the throttle valve and the valve head, taken on the line 10—10 in FIG. 3, looking in the direction of the arrows.

Referring now more particularly to FIGS. 1 and 2 of the drawings, the hoist unit indicated generally by the numeral 30 in each figure is shown in FIG. 1 equipped with a pull cord control comprising pull cords 31 and 32 connected at their lower respective ends by a tie bar 33 adapted to be manipulated by the operator. In FIG. 2 the pull cord control has been eliminated and the pendant control indicated generally by the numeral 34 has been substituted therefor. The pull cord control and the pendant control each serve to control and effect movement of the main throttle-reversing valve contained in the hoist unit 30, the pull cord control effecting valve operation primarily by mechanical means and the pendant control effecting such valve operation by a pneumatic system. The hoist unit 30 is adapted to be supported from a beam or other overhead supporting means by a hook 36, and a load hook 37 on the lower end of a roller chain 38 is adapted to engage a piece of work or load for raising or lowering the same upon operation of the hoist.

As shown more particularly in FIGS. 1 to 3 and 7 of the drawings, the hoist mechanism 30 is contained in a generally cylindrical one-piece housing 39 which is closed at its leftward end, as viewed in FIG. 3, by a circular closure plate 40 and closed at its rightward end by a valve head 41 in which the throttle-reversing valve 124 to be described hereinafter is slidably mounted. The housing 39 is axially divided into three compartments, the rightward compartment 42 serving to house a rotary air motor 43, the center compartment 44 serving to house the sprocket 46 and the leftward compartment 47 serving to house the double planetary reduction gearing and the brake mechanism in the order named from right to left.

Centrally located on the top of the housing 39, there is an upstanding rectangular boss 48 having a circular opening 49 extending downwardly therein. A channel-shaped cap plate 50 extends over the boss 48 and is bolted to the upstanding sides thereof by bolts 51. A threaded shank of the hook 36 extends downwardly through a central opening in the cap plate 50 and into the opening 49 within the boss where it is threadedly engaged by a nut 52 so as to securely suspend the hoist mechanism from the hook 36.

As shown more particularly in FIGS. 3 and 4 of the drawings, the lower part of the casing 39 is cut away as at 53 to provide an opening into the compartment 44 through which the roller chain 38 may pass upwardly into the compartment 44 over the sprocket 46. A semicircular chain guide 54 is positioned over the top of the sprocket 46 and chain 38 in the top of the compartment 44 where it is supported at its lower edges on bolts 56 extending inwardly through the side walls of the casing 39. A stripper unit comprising a horizontal plate 57 having a U-shaped member 58 welded thereto is secured across the underside of the opening 53 by bolts 59. The chain 38 straddles the stripper plate 57 and the stripper unit insures disengagement of the chain 38 from the sprocket 46 as it passes downwardly therefrom in either direction of drive.

Referring to FIGS. 3, 8 and 9 of the drawings, the driving mechanism of the hoist comprises a pneumatic motor 43 having a rotor 60 which is provided at its left end with a square bore 61 in which is received the squared end of an elongated and horizontally extending driving shaft 62, the left end of which is supported by a ball bearing unit 63 secured in the rearward annular opening of a cross support 64 secured in the housing 39. The driving shaft 62 drives the sprocket 46 through a double planetary reduction gearing and is provided with an integral pinion gear 66 adjacent its left end which meshes with a plurality of idler gears 67 which in turn are meshed with a fixed ring gear 68 secured in the housing about the idler gears 67. The idler gears 67 are rotatably mounted on pins 69 carried by a countershaft or spider 70 having a horizontally extending hollow shaft portion 71 encircling the driving shaft 62. The pinion 66, idler gears 67, internal ring gear 68 and countershaft 70 comprise the first reduction unit of the double reduction planetary gear drive.

The horizontal projecting portion 71 of the first reducing countershaft 70 is provided with an integrally formed pinion 72 which is in constant mesh with a plurality of idler gears 73 rotatably carried on pins 74 mounted in a carrier or spider 76. This second group of idler gears 73 are in constant mesh with an internal ring gear 77 also secured in the housing 39. The idler gear carrier 76 of the second gear reducing unit has a splined connection 78 with the left splined end of the sprocket 46 which is supported for free rotative movement in a pair of spaced ball bearings 79 and 80 secured in the central portion of the housing 39. The sprocket 46 is provided with a hollow bore 81 through which the driving shaft 62 extends.

Thus, upon rotation of the rotor 60 of the pneumatic motor 43 in either a forward or a rearward direction, the sprocket 46 will likewise be driven in a forward or rearward direction to raise or lower the chain 38. The rotation of the motor rotor 60 rotates the driving shaft 62 which in turn transmits the driving force through the shaft pinion 66, the first reduction idler gears 67, the first reduction carrier 70, the second reduction pinion gear 72, the second reduction idler gears 73, the second reduction carrier unit 76 to the sprocket 46 through the splined connection 78. The first reducing countershaft or carrier unit 70 is supported for rotation with respect to the driving shaft 62 and the cross support 64 by means of a ball bearing unit 82 at its left side between the carrier 70 and the driving shaft 62 and at its right side by a larger ball bearing unit 83 secured in the annular opening of another cross support 84.

The cross supports 64 and 84 and internal ring gears 68 and 77 are secured together in fixed relation relative to the casing 39 by four elongated bolts 86 extending longitudinally through openings in the outer edges of said supports and internal ring gears. The right ends 87 of the bolts are threaded and are threadedly engaged within threaded openings in the interior of the casing 39, thus securing the supports and ring gears in the casing against longitudinal and rotative movement.

Within the left end of the housing 39 in the compartment 47 and positioned to the left of the double reduction planetary gear drive described above, is a brake mechanism which is adapted to be applied to prevent rotation or release to permit rotation of the drive shaft 62 and the consequent raising or lowering of the load hook 37 under certain conditions of hoist operation. The extreme left end of the driving shaft 62 is formed with splines 88 which are in engagement with splines 89 formed at the inner annular opening of a brake disk or plate 90, the brake disk 90 and the driving shaft 62 thus rotating as a unit. The application of braking force against the brake disk 90 will control and regulate the rate of rotation or non-rotation of the driving shaft 62 as will be described more fully hereinafter.

On either side of the brake disk 90 are disposed annular brake friction plates 91 composed of suitable fibrous material and which are in turn engaged by annular brake clamping plates 92 and 93 on each side thereof. The leftward clamping plate 92 is adapted to be engaged on its left surface by a cup-shaped brake piston 94 which is provided with a sealing member 96 disposed in a groove 97 in the outer periphery of the piston. The sealing member 96 forms a relatively airtight seal between the brake piston 94 and the inner wall of the housing 39. An annular spacing plate 98 is positioned between the brake piston 94 and the outer marginal portion of the left clamping plate 92 and is provided with an inner seal 99 at its central opening for sealing engagement with the horizontally extending portion of the brake piston 94. The spacing plate 98 is secured against inward axial movement relative to the housing 39 by engagement of the plate at its outer periphery with a shoulder 98a formed on the inner wall of the housing. The spacing plate 98 is also provided at its outer portion with a similar sealing member 100 in sealing engagement with the inner wall of the casing 39. As shown in FIG. 3 of the drawings, the spacing plate 98 and the outer radial extending portion of the brake piston 94 are spaced axially of each other to provide a narrow annular space or chamber 101 into which air is introduced under pressure to control operation of the brake mechanism. The chamber 101 is thus substantially sealed at all points except for a constantly open exhaust port 94a extending to the left through the brake piston 94. This port 94a is of restricted size so as to regulate air pressure within the chamber 101, as will be described more fully hereinafter.

A relatively strong brake spring 102 is disposed within the inner end of the brake piston 94 and bears at its inner end against the inturned flange 94b of the brake piston so as to urge the piston and brake plate 92 and friction plate 91 into clamping engagement relative to the brake plate 90 splined to the shaft 62. At its outer end, the brake spring 102 is seated against a cup-shaped bearing plate 103 so that the spring is confined between the brake piston 94 and the bearing plate 103. The tension of the spring 102 may be varied by means of an adjusting screw 104 secured in the closure cap 40 at the left end of the housing 39 thereby varying the amount of braking force applied by the brake.

By the above described brake construction, the brake spring 102 constantly applies axial pressure to the right against the brake piston 94 so as to apply a braking force on the brake disk 90 secured by the splined connection to the driving shaft 62 and this brake force may be entirely relieved or lessened as the case may be as will be described more fully hereinafter by the application of air pressure within the small annular air chamber 101. As air pressure enters the chamber 101, a force is applied against the inner or rightward surface of the brake piston 94 and forces it rearwardly or to the left against the force of the spring 102 so as to relieve or release the braking action against the brake plate 90.

The air motor 43, as shown more particularly in FIGS. 3 and 14 of the drawings, comprises a cylindrical bushing or stator 106 forming a cylindrical chamber in which the rotor 60 is mounted for rotation. The cylindrical bushing 106 is closed at its sides by circular end bearing plates 107 and 108 and laterally extending dowel pins 109 extend through the circumferential portions of the end plates 107 and 108 and of the cylindrical bushing 106 thus forming a unitary motor chamber. The end plates 107 and 108 and the cylindrical bushing 106 are retained against rotation with respect to the main housing 39 and the valve housing 41 by reason of engagement of the left and right ends of the dowel pins 109 in holes in the left wall of the motor compartment 42 of the main housing 39 and in the left end face of the valve head 41, respectively. The leftwardly and rightwardly extending ends of the rotor 60 are received within ball bearing units 110 carried by the end plates 107 and 108, respectively, and retained in position therein by a nut 111 and a screw 112, respectively.

The rotor 60 is provided with eight radial slots 113 in which vanes 114 are disposed for inward and outward radial sliding movement as their outer ends engage and follow the inner wall of the bushing 106. The rotor 60 is eccentrically mounted and positioned with respect to the axis of the cylindrical bushing 106 so that the upper portion of the rotor 60 is in operating engagement with the top inner wall of the bushing, thus causing full retraction of the vanes 114 in the slots 113 when that point is reached upon rotation. However, the lower portion of the rotor 60 is considerably spaced away from the inner bottom wall and the side walls of the bushing 106, thereby forming an air chamber through which driving air under pressure passes in the usual manner and exerts a driving force against the vanes 114. By reason of this novel mounting of the rotor 60 in the upper part of the bushing 106 and by reason of the fact that rotor remains in its upper position at all times when the support hook 36 is operably engaged with a support to suspend the hoist downwardly therefrom, at least three vanes 114 in the three slots 113 in the lower half of the rotor, as viewed in FIG. 14, will be projected by gravity downwardly into engagement with the cylindrical wall of the bushing even when the motor is at rest. Hence, the vanes 114 are in operable position at all times when air is initially admitted into the air motor to actuate the same and it is not necessary to rely upon centrifugal force or inefficient spring structures utilized in the past to project the vanes to their outward sealing position against the bushing walls. Thus, when the hoist 30 is suspended from the hook 36, the rotor 60 and the vanes 114 will be in substantially the position shown in FIG. 14 of the drawings and when air under pressure is admitted to the motor 43 for operation in either direction the vanes 114 are already in their operable position without requiring projection by centrifugal force and thus the rotor 60 will be rotated immediately. This immediate rotation of the rotor 60 under power is of extreme importance as it insures immediate driving of the raising or lowering means under power at any desired rate of variable speed which is achieved instantaneously upon the introduction of air into the motor at the rate selected by the operator. This facilitates precise load positioning and also tends to prevent the initial dropping or sagging of the load as the air is first admitted to the motor. This novel mounting of the air motor 43 in combination with the novel means for releasing the brake at a later point of time than the admission of air under pressure to the air motor 43 to provide an initial build up of air pressure constitutes one of the important features of the present invention.

Figure 11:
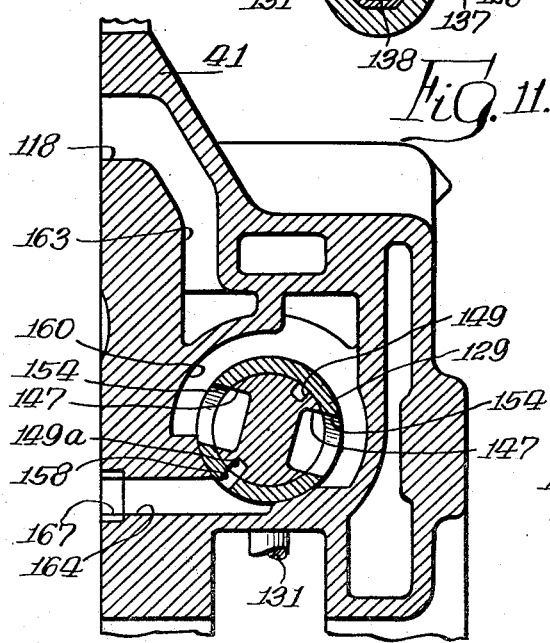
FIG. 11 is a vertical sectional view taken on the line 11—11 in FIG. 10, looking in the direction of the arrows.
Figure 12:
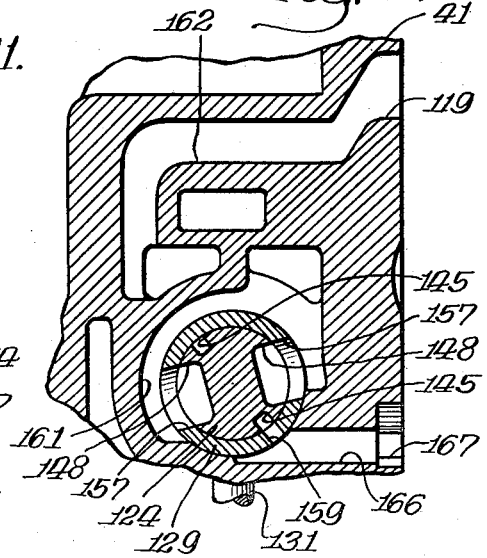
FIG. 12 is a vertical sectional view taken on the line 12—12 in FIG. 10, looking in the direction of the arrows.

As shown in FIG. 14 of the drawings, the motor bushing 106 is provided with two spaced pairs of ports 116 and 117 at the top thereof on each side of the vertical center line and these ports are in registry with the ports 118 and 119, respectively, at the top of the left wall of the valve head 41, as shown in FIGS. 10 to 12, inclusive. These ports 116 and 117 and 118 and 119 serve either as exhaust or as intake ports depending upon the direction of rotation of the motor as determined by the throttle-reversing valve 124 in the valve head. The air ports 116 serve as the intake ports and the air ports 117 as the exhaust ports when the motor 43 is rotated in a counter clockwise direction, as viewed in FIGS. 10 and 14, to raise the load hook. When the air flow is reversed, the motor 43 is driven in a clockwise direction from air intake ports 117 and the load hook is lowered.

The air passages 116 and 117 extend longitudinally through the head of the motor bushing 106 and communicate on each side thereof with arcuate grooves 120 which communicate with the air chamber formed between the outer periphery of the rotor 60 and the inner wall of the motor bushing 106. Exhaust ports 121 are formed in the lower walls of the bearing end plates 107 and 108 at the point of widest spacing between the rotor 60 and the inner wall of the bushing 106, and additional exhaust ports 122 extend through one side wall of the bushing 106 at a point a slight distance upwardly from the bottom thereof.

When air is admitted, for example, to drive the rotor 60 in a load-raising direction with the ports 116 serving as the intake ports, air enters into the air chamber between the rotor and the inner wall of the bushing 106 and directs its force against the projected vanes so as to rotate the rotor 60 in the counterclockwise direction to raise the load on the load hook. Upon rotation of the rotor, air is partially exhausted from the bottom of the motor chamber through the ports 121 in the end plates 107 and 108 and through the auxiliary ports 122 in the bushing. The remainder of the air is exhausted in the usual manner through the ports 117 now serving as exhaust ports. The air which passes out as exhaust through the end plate ports 121 and the bushing ports 122 passes into the arcuate space 170 between the bushing 106 and housing 39 and passes upwardly and out of the top of housing 39 through a plurality of small exhaust ports 123 in the top thereof, as shown in FIGS. 3 and 7. The exhaust air which passes out through the exhaust ports 117 at the top of the bushing enters into the valve head through the large port 119 from which it passes to and around the throttle valve 124 and then back through an exhaust port 126 (FIG. 3) at the bottom of the valve head to the space 170 between the bushing 106 and the main housing 39. This latter exhaust air likewise passes upwardly and outwardly through the housing ports 123 to atmosphere.

When the motor 43 is to be driven in a clockwise direction so as to lower the load on the hook 37, the ports 117 and 119 become the intake ports and ports 116 and 118 become the exhaust ports with the exhaust air passing to and returning from the valve head 41 through the lower large exhaust port 126 which always remains the exhaust port.

The throttle-reversing valve 124 and valve control mechanism is shown at the right end of the hoist mechanism in FIG. 3 of the drawings within the valve head 41. The valve head 41 is bolted to the main housing by a plurality of longitudinally disposed bolts 127. A swivel air inlet fitting 128 is secured in the top of the valve head 41 and is adapted to be connected to a source of air under pressure and to admit such pressure air to the valve mechanism. An oil reservoir 41a and a wick 41b extending upwardly therefrom to a passage (not shown) supplies lubrication to the valve 124, motor 43 and the brake cylinder 101, through the air ports and passages in the valve head 41 and main casing 39.

As shown more particularly in FIGS. 3 and 10 to 13, inclusive, the valve head 41 is provided with a transverse cylindrical bore 125 in which is fixed a ported cylindrical bushing 129. The valve 124 which serves the triple function of a throttle, reversing and brake control valve, is slidable within the bushing 129 and such slidable movement in one direction or the other controls the speed and direction of rotation of the pneumatic motor 43 and actuation of the brake mechanism. The valve 124 which may be a solid body provided with the necessary grooves and openings for controlling the passage of air under pressure as will be described more fully hereinafter, is elongated and of generally cylindrical shape and provided with a radially extending threaded opening 130 on its under side into which an upwardly extending operating valve screw 131 is threadedly engaged. This valve screw 131 extends through a slot 133 in the lower part of the valve head and into a recess 134 in the lower portion of the valve head 41 where it is engaged on either side by rollers 136 mounted on upstanding arms 137 fixed on and extending upwardly from the squared right end of a horizontal valve operating shaft 138.

Shaft 138 is journaled in a longitudinal opening 135 in the lower part of the main housing 39 and valve head 41 on spaced needle bearings 139 and extends across the lower opening of the sprocket compartment 44 where it is operably engaged by a tiltable valve control bar 140. The upper ends of the pull cords 31 and 32 are secured to the opposite ends of the valve actuating bar 140. Thus, as the valve actuating bar 140 is lowered on one side or the other, the valve operating arms 137 will be rocked to exert pressure in one direction or the other against the depending valve screw 131, thus causing sliding movement of the throttle-reversing valve 124 within the bushing 129 in the direction called for by the operator.

Referring more particularly to FIGS. 6, 6a and 10 of the drawings, the valve 124 is counterbored at each of its ends for the reception of a spring bearing cup 141 in which is received a valve spring 142. The other ends of each of the valve springs 142 are received within circular recesses 143 in closure plugs 144 threadedly engaged in each end of the transverse bore of the valve head 41. The respective ends of the valve bushing 129 terminate a short distance from the outer end of the transverse bore 125 so as to provide a seat for the annular flange 141a of the spring cup 141. By this construction, the respective spring cups 141 are adapted for outward movement away from their seats on the ends of the bushing 129 as the respective springs 142 are compressed but they are incapable of movement inwardly beyond the outer ends of the bushing. Thus, when the valve body 124 is moved by the operator in one direction, for example, to the left as viewed in FIG. 10, the left spring cup 141 will be moved to the left and the left spring 142 compressed. However, the right spring cup 141 does not follow the valve 124 to the left because of engagement of its annular flange 142a on the outer right end of the valve bushing 129. A similar action occurs when the valve 124 is moved to the right. As a result, the forces of the valve springs 142 do not oppose each other, thus eliminating all technical difficulties and problems usually encountered in attempting to balance spring forces on opposing ends of a valve body.

Referring more specifically to FIGS. 10 to 13, inclusive, of the drawings, the throttle-reversing valve 124 is provided adjacent each of its ends with a sealing ring 146 which serves to form a seal between the valve 124 and the valve bushing 129. Two pairs of diametrically spaced, elongated and relatively wide grooves 147 and 148 are formed on each side of the valve 124, these grooves being adapted to serve as passages for conducting under air pressure or exhaust air to or from the air motor 43, depending upon which position the valve 124 may be disposed. The grooves 148 at the right end are spaced somewhat closer to the end of the valve 124 than are the grooves 147 with respect to the right end of the valve, this difference in spacing requiring less sliding movement of the valve to the right before the grooves 148 become effective as part of the path of flow of the pressure air relative to the air motor 43. The grooves 148 are spaced approximately 180° from each other around the periphery of the throttle valve 124 and the grooves 147 are similarly spaced at the other end of the valve.

A pair of smaller diametrically spaced grooves 145 at the right end of the valve 124, and another pair of similar grooves 149 and 149a at the other end are also formed in the periphery of the valve 124 approximately 90° from the wider grooves 147 and 148, inclusive. These smaller grooves 145, 149 and 149a serve to conduct air under pressure from the sources of supply, as will be described more fully hereinafter, to the brake mechanism for operation of the same whereas the larger and wider grooves 147 and 148, inclusive, serve to conduct air to or from the air motor 43 for operation of the same. The pairs of grooves 145 and 149 and 149a are connected by diametrically extending passages 149b (see FIG. 6a) so as to equalize the pressure on each side of the valve 124 and to prevent binding thereof in its sliding movement. As shown in FIGS. 10 and 15 to 19, inclusive, the groove 149 is provided with an elongated downwardly tapering entry way 149c extending from a point closely adjacent the sealing ring 146, which point is substantially closer to the end of the valve 124 than are the corresponding ends of the air motor grooves 147 at the same end of the throttle valve. This difference in spacing insures that on the load lowering operation air may be caused to pass through the elongated tapered groove 149 at graduated pressures under the control of the operator to relieve brake force before the air motor 43 is actuated by the passage of air through the large grooves 147. However, at the other end of the valve 124, the outer ends of the large grooves 148 are closer to the end of the valve 124 than are the small grooves 145 with the result that on the load raising operation air under pressure is first introduced into the air motor 43 before such air is delivered to the air brake to release the same.

The threaded entry way at the top of the valve head 41 is connected by transverse passageways 150 and 151, as shown in FIG. 10, to air chambers 152 and 153, respectively, formed at the ends of the valve 124 between the closure caps 144 and the spring cups 141. When air under pressure is thus admitted into the valve head 41 through the fitting 128, the air pressure will be equalized on each side of the valve 124 and no movement thereof will occur, the valve 124 thus remaining in neutral position as long as the actuating bar 140 is not tilted.

As shown more particularly in FIGS. 3, 10 and 13 of the drawings, the valve bushing 129 is provided with three axially spaced pairs of oval openings 154, 156 and 157 through each of the opposite walls of the bushing 129 and these openings or ports are in registry with corresponding ports and passages in the valve head 41. The bushing ports 154 are in registry with the valve grooves 147 and the bushing ports 157 are in registry with the valve grooves 148. The center bushing ports 156 are adapted to be in communication with the large valve grooves 147 or 148 upon sliding movement of the valve 124 in either direction. In neutral position, the central bushing ports 156, which serve in all instances as the exhaust ports, are closed by the valve body between the grooves 147 and 148, inclusive.

The valve bushing 129 is also provided with two relatively small ports 158 and 159 extending radially therethrough and disposed in spaced relation adjacent the ends of the bushing, each being in registry with the small elongated air brake grooves 145, 149 and 149a in the valve 124.

As shown in FIGS. 11 and 12 of the drawings, the bushing ports 154 and 157 are in registry with arcuate passages 160 and 161 in the valve head 41. The passage 160 is connected by passage 162 to the valve head and passage 161 is connected by passage 163 to the valve head port 118, the passages 162 and 163 in the valve head 41 crossing from one side of the valve head 41 to the other. The two small ports 158 and 159 in the valve bushing 129 connect with the two transverse passageways 164 and 166, respectively, in the valve head 41, these passages connecting to and opening into a groove 167 formed in the left face of the valve head 41 and extending diagonally upwardly into registry at its upper end with an elongated longitudinal passage 168 which runs substantially the full length of the main casing 39 to the brake mechanism, as shown in FIGS. 7 and 10.

A central, arcuate exhaust passage 169 in the valve head 41, as shown in FIGS. 3, 10 and 13, registers with the bushing exhaust port 156 and extends around the valve bushing 129 somewhat more than 180 degrees and terminates in the large exhaust port 126, previously described, in the lower portion of the left face of the valve head. As shown particularly in FIG. 3 of the drawings, the exhaust port 126 connects with the air chamber 170 formed between the air motor 43 and the main housing 39 and through which the air is exhausted.

The operation of the hoist above described will be stated with reference to the diagrammatic views of FIGS. 15 to 19, inclusive, of the drawings, the load lowering operation being depicted in FIGS. 17 to 19, inclusive, and the load raising operation in FIGS. 15 and 16. When the pull cord control 33 is in its neutral untilted position of FIG. 1, the throttle-reversing valve 124 is likewise in its neutral position as shown in FIGS. 10 and 13. At this time pressure air enters the valve head 41 through the fitting 128 and passes through passages 150 and 151 to the air chambers 152 and 153 at each end of the valve 124. Since the air pressures in these chambers 152 and 153 are equal, no movement of the valve 124 occurs and it remains in its neutral position.

When the operator desires to lower the load suspended from the hook 37, he depresses one end of the tie bar 33 and tilts the actuating bar 140 which rocks the valve actuating shaft 138 in a counterclockwise direction and pushes the valve screw 131 and valve 124 to the left as seen in FIGS. 10 and 17 to 19, inclusive, thereby compressing left spring 142 in the air chamber 152. When the seal between the bushing 129 and the throttle valve 124 is broken by passage of the sealing ring 146 and end of the valve into the air chamber 152, as shown in FIG. 17, the left tapered end 149c of the small groove 149 first communicates with the air chamber 152 whereas the large grooves 147 for supplying air to the motor 43 are still out of communication with the air chamber. If the operator desires a slow rate of descent, he will limit the tilting movement of the control bar 140 and hold the valve 124 in this initial FIG. 17 range of position. At this point, air will flow into the diagonal groove 167 and through the longitudinal main housing passage 168 to supply air under pressure to the brake but only in a limited amount as determined by the extent to which the tapered groove 149 has been exposed by movement of the valve 124 to the left.

This construction permits the operator to manually cause the valve 124 to be in such a position as to admit only a sufficient amount of air to the air brake chamber 101 to somewhat relieve but not entirely release the braking force of the brake spring 102. The exhaust aperture 94a in the brake piston 94 is of such size as to permit a sufficient build up of air pressure within the brake air chamber 101 to act against the brake piston 94 and to tend to move it to the left against the spring 102. At the same time, the aperture 94a permits the air under pressure to pass out of the brake air chamber in a continuous manner and thus due to air expansion a cooling action on the brake is effected and the heat resulting from the slippage between the faces of the brake elements during slow speed lowering is reduced and carried off from the brake chamber.

This cooling action reduces wear and permits a long operable life of the braking parts. The load is thus slowly lowered by its own weight with a braking force still being applied in a limited but retarding degree. When the desired position of the load is reached, the operator may release the pressure in the pull cord control bar 33 and permit the left valve spring 142 to return the valve 124 to the right and cut off air to the brake, thus permitting the spring 102 to exert its full braking force and stop all further descent of the load. Since operation of the above construction is substantially instantaneous, the operator may stop the load in the precise position desired.

It is to be noted that in the initial FIG. 17 lowering position, the large grooves 147 are still out of communication with the air chamber 152, thus preventing air motor operation.

In the event the operator should desire rate of descent for the load within an intermediate range because of a longer required distance of travel, he will cause the valve 124 to move somewhat further to the left to the FIG. 18 range of position, thus exposing more of the tapered groove 149 in the chamber 152 and thereby permitting a greater amount of pressure air to pass into the brake air chamber 101 to entirely release the brake and permit free rotation of the shaft 62. However, in this intermediate FIG. 18 position, the large valve slots 147 are still out of communication with the valve air chamber 152 and thus no pressure air is admitted to the motor 43 to drive it in a descending direction. Thus, in the second speed stage upon full brake release, the load is permitted to descend at a faster rate and the motor 43 acts as a compressor or dynamic brake permitting medium speed descent without any load on the brake mechanism. At this intermediate stage, the valve grooves 148 are brought into communication with the bushing aperture 156 and the main exhaust duct 169 in the valve head 41 so that air may be exhausted from the air motor 43 when it is driven by the descending load. When the load approaches the desired position, the operator may then manipulate the pull cord to release pressure thereon and cause the valve 124 to return to its initial slow speed stage above described for precise positioning of the load.

However, in the event rapid descent of the load is desired, the operator may cause the valve to move over quickly to the left to its FIG. 19 range of position by pulling down fully on the cord control. Thus, the large grooves 147 are caused to communicate with the air chamber 152 and pressure air passes to the motor 43 to drive the same. Since the small grooves 149 and 149a first communicate with the air chamber 152, the brake is first fully released before the motor is positively driven under air pressure. While the motor 43 is in operation, air pressure is also constantly supplied to the brake to hold the same in released condition. Air under pressure passes through the large grooves 147, through the porting and passages of the valve head 41 above described, and into the air motor 43 through the intake ports 117 which register with the large port 119 in the valve head. The motor 43 is caused to rotate in a clockwise direction and the air is exhausted as shown in FIG. 19 and as previously described. Here again the operator, when the load nears the desired position, may relieve pressure on the pull cord and permit the valve to restore itself to either its intermediate or initial speed positions whereby the operator may more precisely place the load at the position desired.

Should the operator desire to raise the load to a specified position, he pulls down on the other end of the pull cord bar 33 which moves the throttle valve 124 to the right, as shown in FIGS. 15 and 16, to compress the right valve spring 142 and place the right ends of large valve grooves 148 into communication with the air chamber 153 and the large exhaust grooves 147 into communication with the main exhaust duct 169. Air under pressure is thus permitted to pass as above described to the air ports 116 of the air motor 43 to tend to drive it in a counterclockwise direction, as viewed in FIG. 14. However, in the intermediate stage of valve movement shown in FIG. 15, since the small valve grooves 145 are still out of communication with the air chamber 153, no air under pressure passes to the brake so that a pressure build-up occurs at and within the motor 43, although operation thereof is prevented by the brake.

Upon further movement of the valve 124 to the right to its FIG. 16 position resulting from further movement of the pull cord control downwardly, the right ends of small grooves 145 pass into the air chamber 153 and air under pressure then flows into the brake chamber 101 to release the brake and permit motor operation. The small grooves 145 at this end of the valve being the brake release grooves for the raising operation do not have tapered ends and consequently full air pressure is delivered to the brake chamber 101 to release the brake almost instantaneously. Because the air pressure is admitted to the brake so as to effect release thereof at a later point of time, air pressure is built up within the motor 34 prior to brake release with the result that the motor commences immediately to operate in a forward direction when brake release occurs. By this construction and sequence of operation, downward movement or initial sag or drop of a heavy load as the raising operation begins is eliminated.

Sliding movement of the throttle valve 124 and the operational procedures of the hoist under the control of the pull cord mechanism as described above may likewise be accomplished by means of a pendant control system illustrated in FIGS. 2 and 20 to 22 of the drawings. This pendant control system may be substituted for the rocker arm 140, rock shaft 138, the arms 137, the rollers 136 and the valve screw 131. This pendant control system generally comprises valve control cylinders, indicated generally by the numerals 171, secured at each end of the throttle-reversing valve 124 and connected at their outer ends by means of swivel elbows 172 to a pendant handle 173 by means of air hoses 174 and 176. The valve control cylinders 171 may be substituted and applied to the valve head 41 simply by removing the closure caps 144 at each end of the throttle valve 124 and then threadedly engaging the control cylinders 171 in the threaded openings by means of a control cylinder nut 177 having a cup-shaped construction. The pendant handle 173 is provided with a pair of suitable valves 180 and with two triggers 178 and 179 labeled Up and Down as shown in FIG. 21. Depression of the Up trigger will cause movement of the valve 124 to the right to effect release of the brake, counterclockwise operation of the air motor 43 and consequent raising of the load. Similarly, depression of the Down trigger will effect throttle valve movement in the other direction to cause reverse operation of the motor 43 and release of the brake mechanism for lowering movement in the manner described above.

Inasmuch as the air control cylinders 171 and the mechanisms of the pendant valves 180 and triggers 178 and 179 in the pendant handle 173 are identical in structure and operation, a description of one of the cylinders 171, and one of the pendant valves 180 and trigger mechanisms will suffice for the entire pendant control system. As shown in FIG. 20 of the drawings, the valve control cylinder 171 comprises a cylindrical casing 181 threadedly engaged on a threaded annular flange 177a of the connecting nut 177 secured in the valve housing 41. A slidable circular stem 182 having an axial bore 182a therethrough, an opening 182b into the bore adjacent its left end and a restricted port 182b at its right end extends to the right through an axial passage 177b formed through the axis of the nut 177 and connecting with an air chamber 183 within the control cylinder 181. The left end of the stem 182 is seated in the counterbore of the throttle valve 124 and it is encircled by a valve spring 184 which is seated at its left end in the spring cup 142 and bears at its right end against the connecting nut 177. By reason of the cup-shaped nature of the connecting nut enlarged air chambers 186 are formed at the respective ends of the valve 124 which are in communication with the intake air passages 150 and 151 of the valve head 41. Thus, air under pressure admitted into the air chamber 186 enters the bore 182a in the stem 182 through the aperture 182b and passes to the right outwardly through the restricted orifice 182b thereof.

A control piston 187 is secured on the reduced end of the slidable stem 182 and a rubber cylindrical cup-shaped seal 188 of somewhat tubular or sleeve-like form is clamped tightly at its left central portion against the piston 187 by a washer 189 and a retaining nut 190 threadedly engaged on the end of the stem 182. The right end of the tubular rubber seal 188 is clamped between the inturned ends 181a of the control cylinder 181 and the outwardly turned flanges 191 of a cylinder head 192 which are received within the control cylinder 181 and secured therein by means of a plurality of screws 193.

The control piston 187 is thus spaced away from the inner walls of the control cylinder 181 and the seal therebetween is effected by the tubular rubber seal 188 which provides a substantially free floating action of the piston 187 relative to the cylinder 181 and substantially reduces friction. It is unnecessary to build up a relatively great force to overcome break-out friction as is required for a tight fitting piston head against a cylinder wall, which greater force tends to cause the piston and valve to continue past their desired control positions and resulting in an undesired rate of tool operation. Furthermore, the sleeve provides an airtight seal for more positive operation. This substantial reduction in friction and airtight seal results in a valve control mechanism which is more sensitive and more responsive to slide movements of the control mechanism as will be described more fully hereinafter, thus enabling the operator to achieve the precise operation of the hoist as above described.

The cylinder head 192 is also provided with an axial bore 192a and projects outwardly from the control cylinder 181 into the swivel elbow 172 swivelly mounted thereon by means of a locking pin 194. A seal 196 for the swivel elbow is carried in a groove in the cylinder head. The swivel elbow 172 is provided with a duct 197 extending downwardly from the cylinder head 192 and connecting with a passage 192b extending radially from the axial passage 192a. An adapter 198 of tubular construction is secured at its upper end to the lower end of the swivel elbow 172 by a threaded shank 199 extending upwardly therefrom into the lower threaded bore 200 of the swivel elbow. A coil spring 201 is positioned within the threaded shank 199 and bears upwardly against a metal ball 202 comprising a check valve, thus forcing the ball check valve 202 upwardly away from its seat 203 formed on the upper end of the threaded shank 199. The shank 199 has a bore 204 extending therethrough permitting the flow of air from the swivel 172 through the adapter 198. The lower end of the adapter 198 is secured to the hose 176.

The pendant handle 173 comprises a hand grip portion 206, a trigger housing 207 in which the Up and Down triggers 178 and 179 are pivotally mounted and a valve casing portion 208 in which the control valves 180 of identical construction and operation are housed. These portions of the handle may be of integral construction as shown in the drawings and may be provided with fittings 209 at the upper end for connection to the air hoses 174 and 176. The control trigger 179 is pivoted on a pivot pin 179a and has an offset portion 179b adapted to engage the lower end of the slidable valve 180 which projects below the valve casing 208 of the handle into a channel 209 formed in the handle and in which the triggers 178 and 179 are pivoted. The valve 180 is of the spool type having a central portion 180a of reduced diameter which provides a passageway for the air under pressure when the valve 180 is raised by depression of the trigger 179. The upper head 180b of the valve 180 is tapered and flattened on its opposite sides and is slidable in a bushing 210 fixed in the valve casing 208 and having ports 210a therethrough connecting with a transverse air chamber 211 in the casing, this air chamber 211 connecting with a longitudinal passage 212 extending downwardly into the hollow handle 206 thus permitting air to be exhausted downwardly out of the bottom of the handle when the trigger 179 is depressed.

The valve 180 is provided at its upper end with a threaded shank 180c on which a threaded nut 213 is secured for clamping an annular seal 214 against the top of the upper valve head 180b thus providing a seal at the top of the valve bushing 210. The valve nut 213 also serves as a seat for the lower end of a coil spring 215 which extends upwardly into engagement with the underside of a threaded bushing 216 threadedly engaged in an opening extending downwardly into the pendant handle. The spring tends to hold the valve 180 in closed downward position. With a trigger 178 or 179 in normal or undepressed position air under pressure cannot pass downwardly through the pendant handle from the throttle valve control cylinders 171 but upon depression of a trigger the pendant valve will be raised to permit air under pressure to pass downwardly into the handle 206 and out through the bottom thereof.

In operation of the pendant control system, air under pressure is admitted into the valve head 41 and passes into the conduits 150 and 151 to the air chambers 186 on each side of the throttle-reversing valve 124. From the chambers 186, the air then enters openings 182b in the stems 182 of the control piston and pass axially therethrough into the air chambers 183 formed within the rubber sealing sleeve 188 and between the rear side of the control piston 187 and the cylinder head 192. The air then flows through cylinder head ducts 192a and 192b, down through the adapters 198 into the hoses 174 and 176 and fittings 209 into the valve casing 208 to the top of the valves 180 which are in their downward or sealing position, as shown in FIG. 21. Inasmuch as a trigger 178 or 179 has not been depressed so as to raise and open either of the pendant valves 180, no air can flow continuously downwardly through the cylinder heads 192, the swivel elbows 172 and the hoses 174 and 176. Consequently, air under pressure bulids up within the chambers 183 back of the control piston 187 and forces them toward the control valve to compress the springs 185 and cause the stems 182 to exert opposed but balanced pressures against the throttle valve 124. Since the air pressures are balanced on each side of the control pistons 187, the throttle valve 124 in the valve head 41 remains in its neutral at rest position as shown in FIG. 20.

When the operator depresses one of the control triggers 178 or 179 depending upon the desired direction of rotation of the air motor, a pendant valve 180 is moved upwardly and unseats the seal 214 at the top of the valve bushing 210 so as to slide the upper valve head 180b upwardly to a point projecting above the valve bushing 210. The downwardly and inwardly tapered portions on the upper head extend upwardly from the reduced portion 180a of the valve giving a fine initial graduated control as to the amount of air to be permitted to pass out of the valve control cylinder 171 and downwardly and out of the pendant handle 206. Since the angle of the taper causes the opening or orifice to increase progressively as the upper head 180b of the valve 180 is moved upwardly, the amount of air permitted to pass through the pendant handle 206 is increased progressively as a trigger is depressed until the reduced portion 180a of the valve 180 emerges above the valve bushing, thus placing the air chamber 183 of the control cylinder 181 in full communication with the exhaust ducts 211 and 212 in the pendant handle 206.

Because of the fact that air is permitted to escape through the pendant handle 206 upon depression of the trigger 178, for example, a reduction in air pressure occurs up within the valve control cylinder 181 on the right side of the control piston 187, thus unbalancing the air pressures against the air pressures against the respective ends of the valve 124 and causing the valve 124 to be moved over to the right by the expanding force of spring 185 against the left side of the piston. By controlling the degree of opening of the pendant valve 180 by operation of the trigger, the operator thus may control and regulate the degree of pressure in the control cylinder 181 and thus may regulate the extent of movement of the throttle valve 124. The extent of movement of the throttle valve 124 as described above with respect to the manual control, is one of prime importance to provide the operational advantages of the present invention and this may be accomplished in all respects by the pendant control valve system.

The above described pendant control system also includes a protective safety feature which automatically brings about complete cessation of operation of the hoist and full application of the brake under full brake spring pressure in the event of failure of the control hoses 174 or 176 or any other element in the air line of the pendant control. This protective feature involves coordination and balancing of orifice sizes at three points in the pendant control system. The first orifice point is that produced by the port 182c contained in the right end of the control stem 182. The second orifice imposed in the system is that formed between the bore 197 in the swivel elbow 172 and the outer periphery of the safety ball check 202. The third orifice existing in the system is that formed by the upper head 180b of the pendant valve 180 and the bushing 210. It is to be noted that the orifice formed by the control stem 182 will permit greater quantity of air to pass therethrough than can be handled by the safety check ball orifice. However, the amount of air flowing through the control stem is maintained in a reduced quantity of flow by control of the pendant valve orifice, such reduced quantity continuing even with the pendant valve 180 in full open position. Hence, as long as the pendant valve orifice remains in control of the system, the amount of air flowing from the control stem orifice 182b is restricted below the amount required to depress the safety ball check 202 and force it back on the seat 203 formed at the head of the threaded shank 199. However, in the event one of the air hoses 174 and 176 should break due to operational twisting, wear and the like so as to short-circuit the pendant valve orifice from the system, a greater amount of air will be permitted to flow through the control stem orifice 182c, this amount of air being greater than that which can be handled by the orifice of safety check ball 202. Therefore, a build-up of pressure occurs above the safety check ball 202 and forces it down on the seat 203 of the threaded shank 199 so as to close the air passages therebelow to the broken air hose. As a result of closure of the orifice of the check valve 202, the air pressure in the valve control cylinder 181 immediately returns to full line pressure so as to equal the pressure in the control cylinder 181 at the other end of the valve 124 to force the piston 187 and the stem 182 to the left, thus causing the valve 124 to return to its neutral position under the urge of the valve spring 184. Return of the valve 124 to its neutral position immediately cuts off air pressure from releasing connection with the brake and the full spring power reapplies the brake, and air pressure is also cut off from the motor 43.

The practical result of the above described safety feature is to hold the load at a fixed elevation on the end of the chain in the event of breakage of an air hose 174 or 176. It has been found that with the hoist supporting a load as much as 1000 pounds, an air hose 174 or 176 can be completely ruptured without damage or injury since the drop of load is eliminated before the brake is automatically but positively applied to lock the parts. This results in a hoist having safety characteristics preventing damage or breakage of the load and eliminating physical injury to operators and plant workers in the event of hose or part failure. Such a system also eliminates the need of an additional safety lever in the pendant handle which is cumbersome in operation and requires conscious manipulation on the part of the operator to become effective. With the present safety feature, the hoist ceases operation at the instant of hose breakage without requiring any conscious or intentional act on the part of the operator in that it is automatically achieved as above described.

Although there have been described above several embodiments of the present invention, it is to be understood that changes and modifications may be resorted to without departing from the spirit and scope of the appended claims.

I claim:

1. A control mechanism for a hoist of the type having an air motor, load engaging means driven by the motor and engageable with a load for raising or lowering the load, brake means for applying a braking force against said load raising and lowering means comprising means for normally applying said braking force and means operable by air under pressure to release the brake, said control mechanism comprising a valve for directing the flow of air under pressure to said air motor and to said brake means, means for conducting pressure air from a source to said valve, means for conducting pressure air from said valve to said air motor to drive the same in a load raising direction, means for conducting pressure air from said valve to said brake means, said valve being movable in one direction in the load raising operation to a first position in which said valve has passage means for directing pressure air to said motor air conducting means whereby a driving force is applied to said air motor prior to brake release and said valve means being movable beyond said first position to a second position in which said valve has additional passage means for directing pressure air to the brake air conducting means to release the brake, and means for moving said valve in said one direction and return.

2. A control mechanism for a hoist of the type having an air motor, load engaging means driven by the motor and engageable with a load for raising or lowering the load, brake means for applying a braking force against said load raising and lowering means comprising means for normally applying said braking force and means operable by air under pressure to release the brake, said control mechanism comprising a valve for directing the flow of air under pressure to said air motor and to said brake means, means for conducting pressure air from a source to said valve, means for conducting pressure air from said valve to said air motor to drive the same in a load raising direction, means for conducting pressure air from said valve to said brake means, said valve having a passage for connecting said air source conducting means to said motor air conducting means upon initial movement in one direction to a first position in the load raising operation and another passage for connecting said air source conducting means with said brake air conducting means upon further movement in said one direction beyond said first position to a second position whereby pressure air is directed to the motor prior to brake release to apply a driving force thereagainst and pressure air is directed to the brake to release the same when driving force is already applied to the motor, and means for moving said valve in said one direction to said first and second positions and return.

3. A control mechanism for a hoist of the type having an air motor, load engaging means driven by the motor and engageable with a load for raising or lowering the load, brake means for applying a braking force against said load raising and lowering means comprising means for normally applying said braking force and means operable by air under pressure to release the brake, said control mechanism comprising a valve for directing the flow of air under pressure to said air motor and to said brake means, means for conducting pressure air from a source to said valve, means for conducting pressure air from said valve to said air motor to drive the same in a load raising direction, means for conducting pressure air from said valve to said brake means, said valve serving to block connection of said air source conducting means with said motor air conducting means and said brake air conducting means, and said valve having an air groove adapted to register with said motor air conducting means and closely spaced with respect to and movable toward said air source conducting means into registry therewith and a second air groove adapted to register with said brake air conducting means and spaced farther away than said first air groove from said air source conducting means and adapted to move into registry therewith, and means for effecting raising movement of a load by moving said valve in one direction to first bring the first air groove into registry with said air source conducting means and for moving said valve farther in said one direction to also bring the second air groove into registry with said air source conducting means whereby said brake is not released until after a driving force has first been applied to the air motor in a load raising direction.

4. A control mechanism for a hoist of the type having an air motor, load engaging means driven by the motor and engageable with a load for raising or lowering the load, brake means for applying a braking force against said load raising and lowering means comprising means for normally applying said braking force and means operable by air under pressure to release the brake, said control mechanism comprising a valve for directing the flow of air under pressure to said air motor and to said brake means, means for conducting pressure air from a source to said valve, means for conducting pressure air from said valve to said air motor to drive the same in a load lowering direction, means for conducting pressure air from said valve to said brake means, said valve means being movable in one direction in the load lowering operation to first, second and third range positions for variable speeds of operation, said valve means having means for directing pressure air in a restricted amount to the brake air conducting means in its first range position whereby the brake is partially released to permit slippage thereof and lowering of the load at a slow rate of speed within a low range and for directing pressure air in a greater amount to the brake air conducting means in the second and third range positions to fully release the brake to permit more rapid lowering of the load, and said valve means also having means operable in the third range position for directing pressure air to the motor air conducting means to drive the motor and lower the load at faster rates of speed, and means for effecting movement of said valve to said three ranges of operating positions and return.

5. A control mechanism for a hoist of the type having an air motor, load engaging means driven by the motor and engageable with a load for raising or lowering the load, brake means for applying a braking force against said load raising and lowering means comprising means for normally applying said braking force and means operable by air under pressure to release the brake, said control mechanism comprising a valve for directing the flow of air under pressure to said air motor and to said brake means, means for conducting pressure air from a source to said valve, means for conducting pressure air from said valve to said air motor to drive the same in a load lowering direction, means for conducting pressure air from valve to said brake means, said valve serving to block connection of said air source conducting means with said motor air conducting means and said brake air conducting means, and being movable selectively to first, second or third ranges of positions for variable speed operation and said valve having a tapered air groove adapted to register with said brake air conducting means and closely spaced with respect to and movable toward said air source conducting means for registry of the small end of the tapered groove therewith in said first range position to permit a restricted amount of pressure air to flow to said brake to partially release the same, and for registry of the larger portion of the tapered groove therewith upon further movement of said valve into said one direction into said second range position to fully release said brake, and said valve also having a second air groove in registry with said motor air conducting means and spaced farther away than said tapered air groove from said air source conducting means and adapted upon continued valve movement to said third range position to register with said air source conducting means and to direct pressure air to said motor to drive the same and lower the load at a faster rate of speed, and means for effecting movement of said valve to said three operating ranges of position and return.

6. A control mechanism for a hoist of the type having an air motor, load engaging means driven by the motor and engageable with a load for raising or lowering the load, brake means for applying a braking force against said load raising and lowering means comprising means for normally applying said braking force and means operable by air under pressure to release the brake, said control mechanism comprising a slidable speed control and reversing valve for directing the flow of pressure air to said motor and to said brake means and movable in one direction to effect driving of the motor in one direction and raising of the load and release of the brake and in the other direction to effect driving of the motor in a reverse direction and lowering of the load and release of the brake, means for conducting pressure air from a source to said valve, means for conducting pressure air from said valve to said motor to drive the same in a load raising direction, means for conducting pressure air from said valve to said motor to drive the same in a load lowering direction, means for conducting pressure air from said valve to said brake, said valve being movable in its load raising direction to a first range position in which said valve has means for directing pressure air to the motor air conducting means to apply a driving force to said motor prior to brake release and movable farther in said load raising direction to a second range position in which said valve means continues to supply pressure air to said motor and there are additional means for directing pressure air also to the brake air conducting means to release the same whereby said brake is not released until after a driving force is applied to the motor, and said valve being movable selectively in the other load lowering direction to first, second or third range position for variable speed operation and having means for directing pressure air in a restricted amount to the brake air conducting means in said first range position whereby the brake is partially released to permit slippage thereof and lowering of the load at slow rates of speed and for directing pressure air in a greater amount to the brake air conducting means in said second and third range positions to permit rapid descent, and said valve having means operable in said third range position for directing pressure air to the motor conducting means to drive the motor and lower the load at faster rates of speed, and means for selectively moving said valve in said one direction or the other to said positions and return.

7. A control mechanism for a hoist of the type having an air motor, load engaging means driven by the motor and engageable with a load for raising or lowering the load, brake means for applying a braking force against said load raising and lowering means, comprising means for normally applying said braking force and means operable by air under pressure to release the brake, said control mechanism comprising a slidable speed control and reversing valve for directing the flow of pressure air to said motor and to said brake means and movable in one direction to effect driving of the motor in one direction and raising of the load and release of the brake and in the other direction to effect driving of the motor in a reverse direction and lowering of the load and release of the brake, means for conducting pressure air from a source to the respective ends of said valve, means for conducting pressure air from said valve to said motor to drive the same in a load raising direction, means for conducting pressure air from said valve to said motor to drive the same in a load lowering direction, means for conducting pressure air from said valve to said brake, said valve adjacent one of its ends having an air passage connecting with said motor air conducting means and another air passage connecting with said brake air conducting means and spaced farther away with respect to said end of said valve and said air source conducting means, and said valve adjacent the other of its ends having a tapered air passage connecting with said brake air conducting means and another air passage connecting with said motor air conducting means and spaced farther away from said other valve end and from said air source conducting means, and means for selectively moving said valve in one direction or the other to selectively and sequentially connect said air passages with said air source conducting means.

References Cited in the file of this patent

UNITED STATES PATENTS

| Number | Name | Date |
|---|---|---|
| 1,503,922 | Slater | Aug. 5, 1924 |
| 1,738,308 | Meunier | Dec. 3, 1929 |
| 2,246,923 | Meunier | June 24, 1941 |
| 2,257,892 | Van Sittert et al. | Oct. 7, 1941 |
| 2,322,063 | Schnell | June 15, 1943 |
| 2,445,585 | Shaff | July 20, 1948 |
| 2,644,307 | Blair | July 7, 1953 |
| 2,645,530 | Pickert | July 14, 1953 |
| 2,735,268 | Stelzer | Feb. 21, 1956 |
| 2,743,708 | Lungerhausen | May 1, 1956 |
| 2,823,775 | Zwayer | Feb. 18, 1958 |
| 2,845,048 | Fraser | July 29, 1958 |
| 2,895,494 | Adelson | July 21, 1959 |
| 2,905,199 | Cook | Sept. 22, 1959 |
| 2,927,669 | Walerowski | Mar. 8, 1960 |
| 2,930,658 | George | Mar. 29, 1960 |
| 2,997,028 | Ayers | Aug. 22, 1961 |
| 2,997,029 | Bennett et al. | Aug. 22, 1961 |